(12) United States Patent
Theel

(10) Patent No.: US 6,623,328 B1
(45) Date of Patent: Sep. 23, 2003

(54) DISMEMBERABLE CANINE APPEASEMENT DEVICE AND METHOD

(76) Inventor: Julie Theel, 1546 Valencia Dr., Newport Beach, CA (US) 92660

( * ) Notice: Subject to any disclaimer, the term of this patent is extended or adjusted under 35 U.S.C. 154(b) by 0 days.

(21) Appl. No.: 10/154,217

(22) Filed: May 20, 2002

(51) Int. Cl.[7] ................................................. A63H 3/02
(52) U.S. Cl. ........................ 446/369; 119/707; 446/901
(58) Field of Search ........................ 446/369, 99, 901, 446/100, 371, 268, 4–5, 385; 273/156, 157 R, 159; 119/707, 709–711, 702, 712, 905; 434/258, 393

(56) References Cited

U.S. PATENT DOCUMENTS

| | | | | |
|---|---|---|---|---|
| 1,544,618 A | * | 7/1925 | Waite | |
| 3,117,384 A | * | 1/1964 | Billis | |
| 3,222,072 A | * | 12/1965 | Dreyer | |
| 3,375,604 A | * | 4/1968 | Alonso | |
| 4,208,832 A | * | 6/1980 | Corriveau | |
| 4,579,537 A | * | 4/1986 | Leahy | ......................... 446/100 |
| 4,755,141 A | * | 7/1988 | Nakai | ......................... 434/258 |
| 4,883,441 A | * | 11/1989 | Byer | ............................ 446/99 |
| 4,921,461 A | * | 5/1990 | Fujikawa | ..................... 446/296 |
| 5,090,935 A | * | 2/1992 | Monson | ....................... 446/101 |
| 5,108,100 A | * | 4/1992 | Essebaggers et al. | ... 273/153 R |
| 5,195,917 A | * | 3/1993 | Russell et al. | ................. 446/97 |
| 5,799,616 A | * | 9/1998 | McClung, III | .............. 119/709 |
| 6,174,216 B1 | * | 1/2001 | Chianese | ..................... 446/320 |

\* cited by examiner

Primary Examiner—Derris H. Banks
Assistant Examiner—Jamila Williams
(74) Attorney, Agent, or Firm—Clement Cheng

(57) ABSTRACT

A method of appeasing a domestic animal comprising the steps of forming members having a fabric exterior member interface surfaces. The member interface surfaces are capable of repeated nondestructive disconnection and reconnection via attachment means. Members connect at their interface surfaces to form a cartoon character of predetermined configuration and shape. A user allows a domestic animal such as a canine to rend apart members to simulate destruction of the figure. A user reassembles said figure by attaching members using the attachment means at the interface surfaces. A user can repeat the last two steps until appeasement of the domestic animal.

10 Claims, 5 Drawing Sheets

DISMEMBERABLE CANINE APPEASEMENT DEVICE AND METHOD

DISCUSSION OF RELATED ART

The natural prey instinct in a canine makes it difficult for dogs to refrain from rending ordinary household items such as furniture, plush animals, shoes and carpet. The natural hunting instinct in a canine is curbed during domestication. The resulting frustration leads to unhealthly fits of destruction.

Because many household items are often torn apart by a dog, one can conclude that dogs have the need to tear items apart as well as the need to chew on certain items. The prior art shows various toys that attempted to satisfy canine urges. In U.S. Pat. No. 6,216,640, Zelinger discloses a play ball that can be chewed. The play balls are replaceable to extend life of the play ball toy. Other play toys have a rawhide cover allowing a dog to chew on the play device. Although many devices allow a canine the satisfaction of chewing, canines also have a need to rend and rip.

U.S. Pat. No. 4,208,832 is a constructible animal doll made of detachable parts with hook and loop tape to allow a child to interchange animal parts between various animals. The animals disclosed are a feline, an elephant, a beaver, and a mosquito. The children's animal doll can teach children various animals and serves as an educational device. U.S. Pat. 5,788,554 also allows children to create more than one animal from a plurality of interchangeable animal parts. U.S. Pat. No. 6,116,979 creates a geometric body from a plurality of detachable uniform units. Unfortunately, these child educational devices cannot be used with canines.

OBJECT OF THE INVENTION

It is an object of the invention to provide a toy for a dog that rips apart and can be reassembled for reuse.

LIST OF DRAWINGS

BRIEF SUMMARY OF THE INVENTION

The present invention encompasses a method of providing a plush play toy for pets such as a dog by means of detachable rendable members. By allowing a canine to detach portions of a plush toy, canines can alleviate frustration and domestication related anxiety. The attachments allow a dog to take apart the pet toy and play with individual parts. A human can reassemble the members for repeated use.

Detachable portions of a plush toy are particularly adapted to the teeth of a canine, thereby preventing their destruction. These portions can be made of the sturdy materials that dog toys are usually made of such as denim, plush, corduroy or a rubbery material such as vinyl, latex polyethylene. The sections are adapted to the teeth of a dog and sized large enough to prevent accidental swallowing. Being sturdy, they can withstand biting, chewing and rending. Being made of a thick material, a dog can play with a detached portion individually without owner concern regarding the safety of the dog or device.

DESCRIPTION OF THE PREFERRED EMBODIMENT

The present invention is a dog toy that comprises a plurality of members disconnectable by a dog. A dog must apply a substantial amount of force in order to detach the members. In this way, a dog can be challenged when dismembering the device. Preferably, a main member is attached to various secondary members. All members are of sufficient size to prevent swallowing by a dog.

Figure 1:
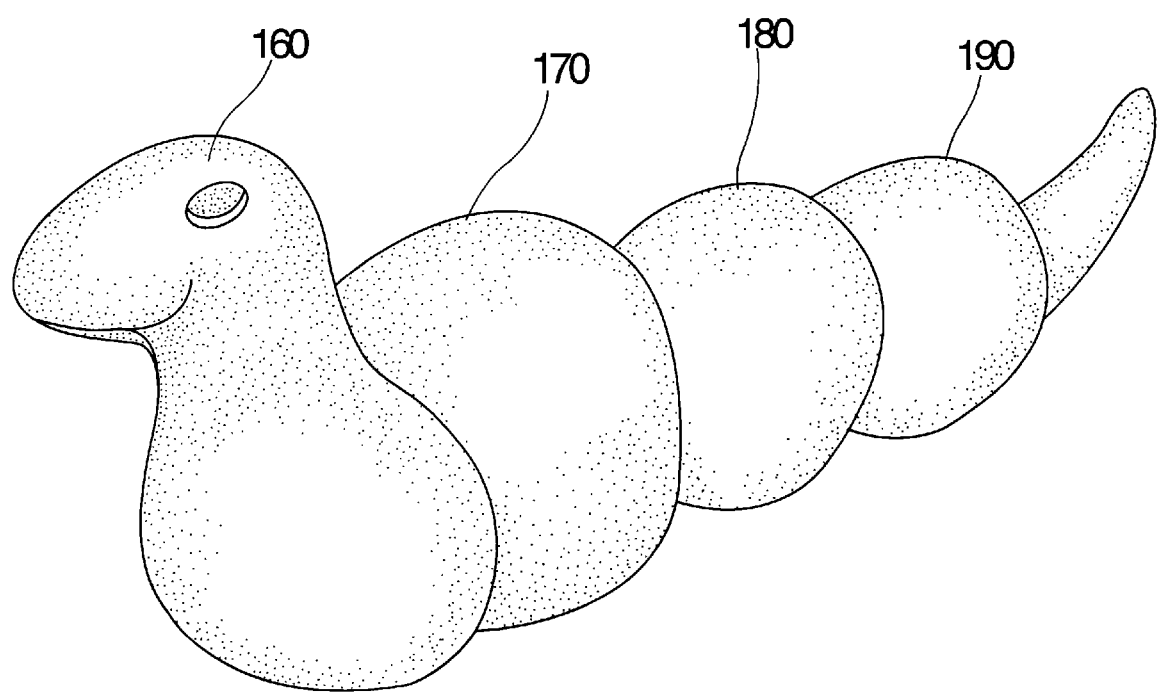
FIG. 1 is a perspective view of an assembled snake character.
Figure 2:
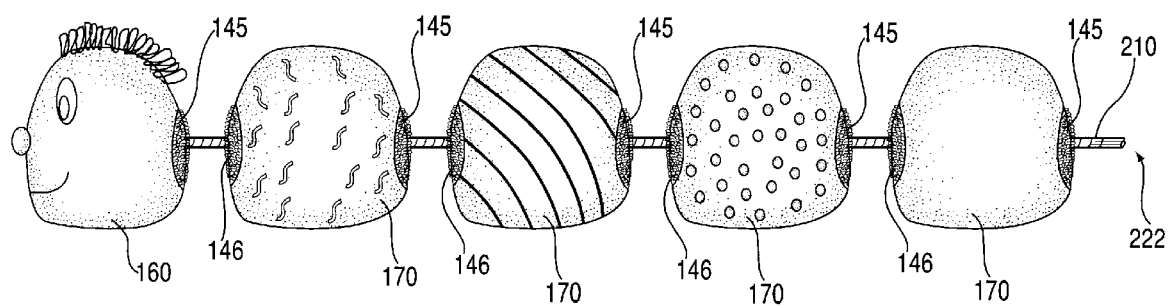
FIG. 2 is a side view of a worm character having detached parts.
Figure 3:
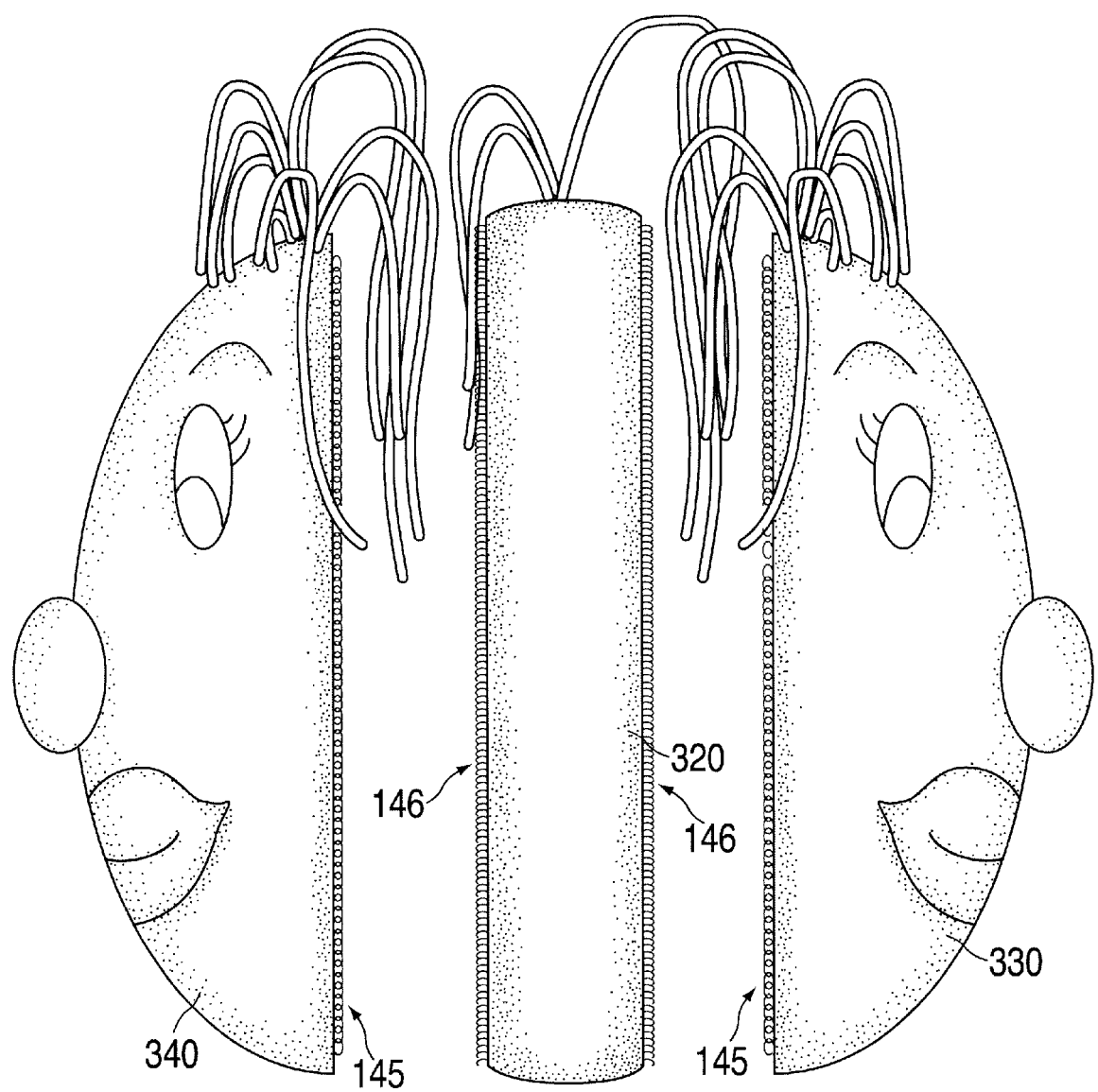
FIG. 3 is a side view of a three part ball character having faces on each side.
Figure 4:
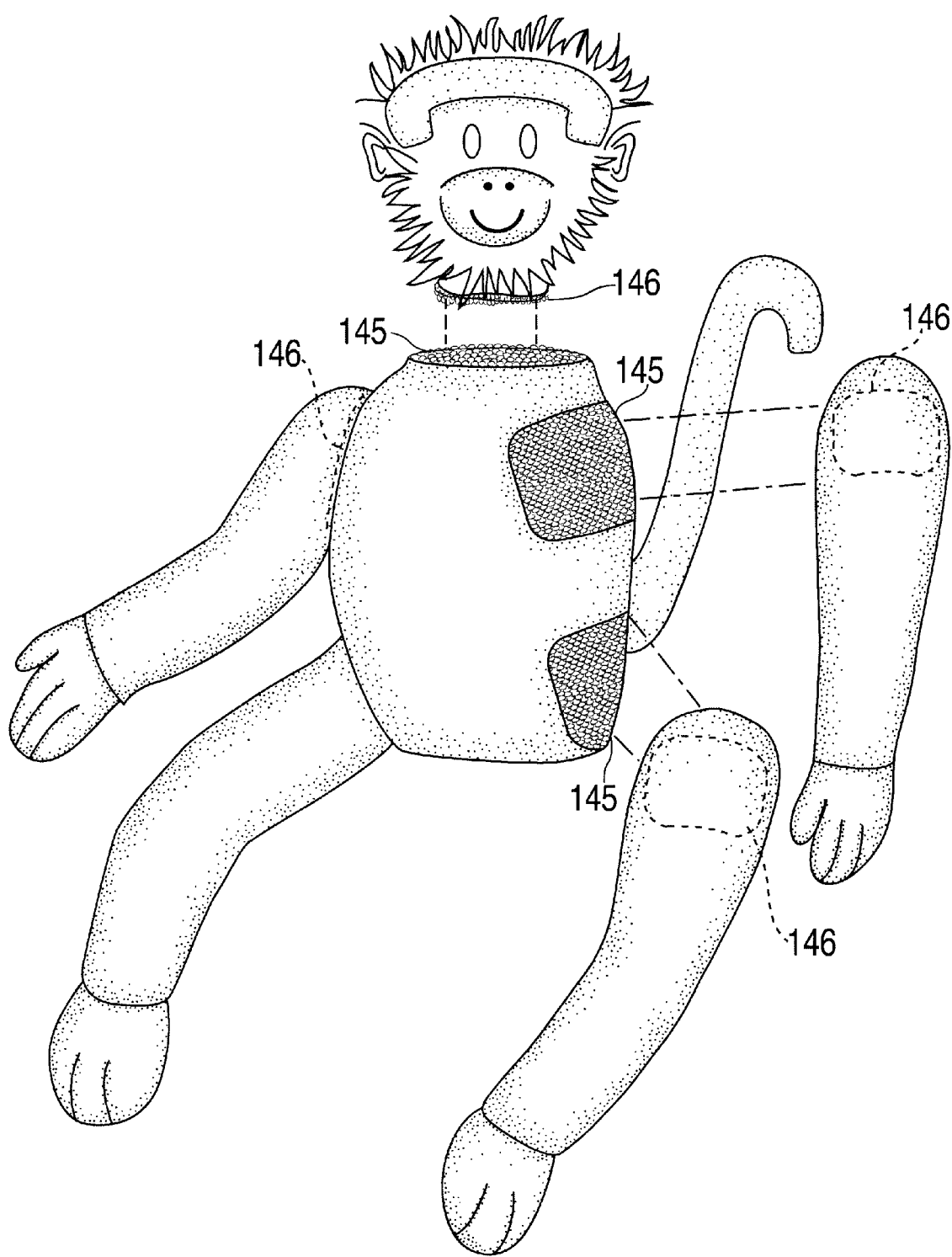
FIG. 4 is a perspective view of a monkey character having detachable limbs.

In a first embodiment FIG. 1, a snake like character having multiple sections is shown in figure one. The snake has a main head section 160 and a plurality of body sections 170. FIG. 2. A snake or worm can be made of a number of segments 160, 170. These segments have connecting means between them that allow connection between different segments. The main section is preferably connected to other sections by means of detachable and reattachable hook 145 and loop 146 tape secured to the inside interface surface 145, 146. Hook and loop tape is preferred due to its ability to creating a ripping noise when detaching. Alternatively, the main section can be connected to the first body section by snaps or magnets. Magnets can be made in a soft pliable material and located underneath the sturdy cloth to be invisible to a canine.

A snake or worm can also have a connecting rope or string 210 threaded through the axis of the body. The rope 210 can pass through the segments of the snake or worm. The rope 210 attaches to the head at a first end and passes through each of the members of the snake or worm to terminate freely at a second end 222. After a canine disassembles the worm members 146, a user can pull at either end of the rope 210, preferably at the second end 222, to reassemble the worm. The rope is positioned to allow the proper orientation of member parts upon reassembly. A rope or string connecting the individual members can allow easier recovery of individual members.

For large animals having more bite power, the interior of a plush member normally filled with loose stuffing can be substituted with a roll of cloth or fabric such as denim. The roll or folded cloth can be stitched together to create a unitary piece and provide resistance to the jaw of a large animal having more bite power. The interior of the plush member can also be kept loose. and light for a small animal having less bite power.

A second member is the main member 320 and forms a circular disk shaped cylinder having two flat connecting interface surfaces. A third member 330 is substantially similar to the first member but may have a different expression or gender to allow for variation in design.

The device can be dismembered by a canine. The dog can first grasp the first member 310 in a maw and can place a paw on the main section 320. With persistent effort, the dog can remove the first member from the main section. As the dog removes the first member 310, the dog can change position as necessary. A retaining cord made of rope or string can optionally join the three members along a central axis perpendicular to the section interface, to prevent loss of parts and assist reassembly. In this case, the retaining cord can be attached to either the main member or the third member.

A third embodiment encompasses a plush type animal having a main section being a torso. A plurality of secondary members forms appendages or portions of a plush animal. An animal figure such as a monkey figure can be formed from a main torso section and a number of appendages. For a monkey, the main section can receive six secondary members including a head section, a tail, a pair of legs and a pair of arms. The third embodiment allows a canine to remove appendages from an animal. Because a canine lacks opposing digits, a flat surface is difficult to grasp. Flat surfaces optionally include attachments. These protrusions attached to the flat surfaces allow ease of manipulation by a dog. They may include, for example, a plurality of rope pieces simulating hair on a cartoon face figure allowing a dog to grasp at the rope pieces on the a cartoon face. In another example of a protrusion is cartoon face figure having a wooden knob simulating a nose. Such attachments are not completely detachable from the member to prevent an animal from swallowing the attachments. A cord can attach various appendages of an animal figure as seen in the third embodiment.

The first embodiment can also have separate cords connecting between each member. The benefit of a single rope would be simplicity in design and manufacturing as well as simplicity in the reassembly. With a single rope, intermediate members are allowed transverse movement along the rope or cord. Thus, a single rope configuration allows a user to grasp one end of a rope and pull the members toward the main member without additional work or steps.

Figure 5:
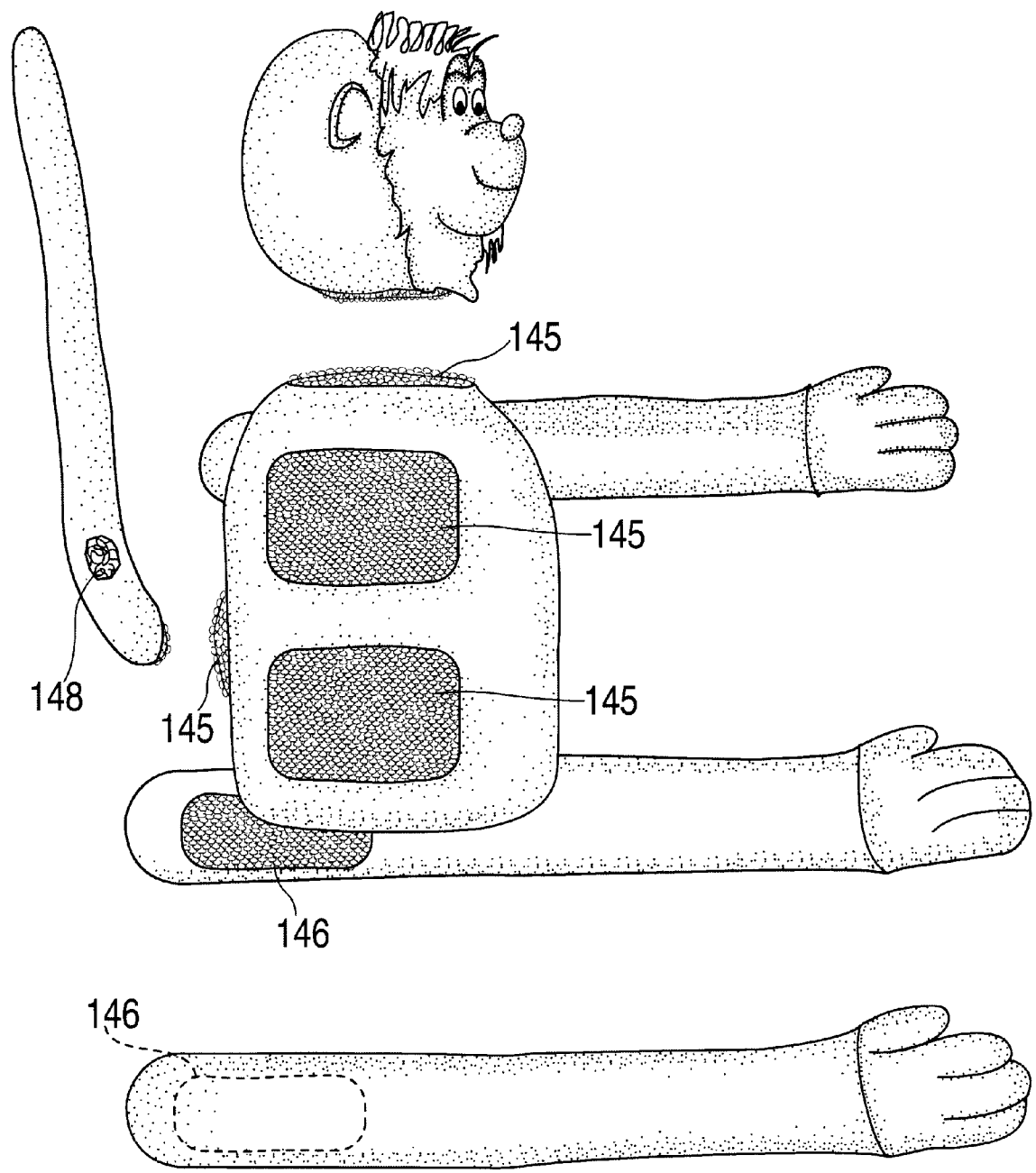
FIG. 5 is a side view of a monkey character having detachable limbs.

A monkey or other cartoon animal, as seen in the third embodiment, can be connected by a plurality of cords traveling through a main section and attaching to a tail member. A user can pull the tail member and reassemble the cartoon animal with ease. The user then connects the tail member to the cartoon animal. FIG. 5. Slack cord can be kept inside a hollow portion of a member 148 such as a tail member.

Analogously, any other appendage can be used as the terminal point of a plurality of cords. Because cords are connected to each appendage and travel through a hollow portion of the main section, the cords can be adjusted so that all cords allow the same length of travel. This assists a user in reassembly of the device.

A user can use the device to assist in playing with a dog by simply tossing the character to the dog when the dog is bored or upset. In the case of the snake character, a user can hold the snake and allow a dog to sequentially remove member of the snake. The user can also use the snake character having a medial retaining cord by holding the snake at a tail end and allowing the dog to sequentially remove members of the snake. Optionally, the medial retaining cord 210 can be made of elastic material such that it can automatically reassemble the character immediately upon release of a member by a dog. Elastic cord allows the user to save time in the reassembly process. The elastic cord is positioned to allow automatic reassembly of character members in proper predetermined configuration. This configuration can be useful when a user is not present to reassemble a cartoon figure.

The length of travel in an elastic cord configuration can be adjustable. A user can set the length of travel in the elastic cord to a zero length not allowing play in the cord. This allows automatic reassembly that is useful when a user is not present to reassemble the cartoon figure. A user can set the length of travel in the elastic cord to a longer length to allow interaction between a user and his or her pet.

A user can implement the adjustable play in an elastic cord where a user can tie a portion of the elastic cord to a member. The slack portion can also be retained by a knot or by commonly available means of retaining a slack portion of cord. Optionally, a user can place a slack portion of elastic cord inside a cavity, such as a pocket, formed in a member to allow safe storage of the slack portion of the elastic cord. A zipper disposed on the opening of the cavity 148 can close the member to prevent opening or entanglement.

Elastic cord may be attached at interface surfaces where members are designed to reattach. In the use of the elastic cord, preferably hook and loop tape allows automatic reassembly and orientation of character members.

The foregoing describes the preferred embodiments of the invention and modifications may be made without departing from the spirit and scope of the invention as set forth in the following claims.

What is claimed is:

1. A method of appeasing and training a house dog to prevent destruction of household articles comprising the steps of: forming a main member having a fabric exterior and at least one main member interface surface; forming a plurality of secondary members having a fabric exterior and at least one secondary member interface surface, said main member interface surface and secondary member interface surface capable of repeated nondestructive disconnection and reconnection via attachment means located on all said main member interface surfaces and secondary member interface surfaces, said at least one secondary member attached to the main member by an attachment means at an interface surface, connecting the main member and secondary members at their interface surfaces to form a plush character; allowing a house dog to rend apart said members to simulate destruction of the plush character;

reassembling said plush character by attaching members using the attachment means at the interface surfaces; repeating the last two steps until appeasement of the house dog is satisfied.

2. A method according to claim 1 wherein said attachment means consist of hook and loop tape.

3. A method according to clam 1 wherein said attachment means consist of hook and loop tape, said hook portions of tape matedly attachable only to loop portions of tape, said loop portions affixed to said interface surfaces of secondary members to receive their respective hook portions on said interface surfaces of the main member to form a connection, said connection configured to allow construction of a plush character.

4. A method according to claim 1 wherein said loop portions are affixed to said interface surfaces of the main member to receive only their respective hook portions on said interface surfaces of secondary members to form a connection.

5. A method according to claim 1 wherein said figure of predetermined shape forms a snake, said snake having a head member, a tail member and a plurality of intermediate members, linearly nearly disposed to resemble a snake character.

6. A method according to claim 1 wherein said figure of predetermined shape forms a ball wherein said ball is formed from similarly shaped members.

7. A method according to claim 1 wherein said figure of predetermined shape resembles a cartoon animal, said cartoon animal having a detachable torso member, a head member, two arm members and two leg members.

8. A method according to claim 1 further comprising attaching elastic cord between members to automatically restore connection between connection means disposed upon interface surfaces, said elastic cord restoring predetermined configuration of character members.

9. A method according to claim 8 wherein said cord is not elastic.

10. A method according to claim 8 wherein said cord is threaded through members.

\* \* \* \* \*